(12) United States Patent
Geissler

(10) Patent No.: US 6,865,096 B1
(45) Date of Patent: Mar. 8, 2005

(54) POWER CONVERTOR WITH LOW LOSS SWITCHING

(75) Inventor: Steven Geissler, Little Chute, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/629,377

(22) Filed: Jul. 28, 2003

Related U.S. Application Data

(60) Continuation of application No. 10/176,712, filed on Jun. 20, 2002, now Pat. No. 6,625,046, which is a continuation of application No. 09/778,697, filed on Feb. 7, 2001, now Pat. No. 6,426,888, which is a continuation of application No. 09/495,969, filed on Feb. 2, 2000, now Pat. No. 6,266,257, which is a division of application No. 09/111,950, filed on Jul. 9, 1998, now Pat. No. 6,115,273.

(51) Int. Cl.[7] .......................... H02M 7/04; H02M 7/125
(52) U.S. Cl. ........................................ 363/89; 363/53
(58) Field of Search ........................... 363/16, 17, 50, 363/52, 53, 55, 56.01, 56.02, 56.03, 56.05, 89, 97, 98, 125, 127, 131, 132; 323/222, 223

(56) References Cited

U.S. PATENT DOCUMENTS

| | | |
|---|---|---|
| 4,375,077 A | 2/1983 | Williams |
| 4,635,181 A | 1/1987 | Bourgeault |
| 4,769,754 A | 9/1988 | Reynolds et al. |
| 4,849,873 A | 7/1989 | Vanderhelst |
| 4,857,822 A | 8/1989 | Tabisz et al. |
| 5,010,471 A | 4/1991 | Klaassens et al. |
| 5,047,913 A | 9/1991 | DeDoncker et al. |
| 5,166,549 A | 11/1992 | DeDoncker |
| 5,270,914 A | 12/1993 | Lauw et al. |
| 5,307,005 A | 4/1994 | Ahladas et al. |
| 5,313,382 A | 5/1994 | Farrington |
| 5,321,348 A | 6/1994 | Vinciarelli et al. |
| 5,343,016 A | 8/1994 | Davis et al. |
| 5,343,140 A | 8/1994 | Gegner |
| 5,412,310 A | 5/1995 | Wolk et al. |
| 5,414,613 A | 5/1995 | Chen |

(List continued on next page.)

FOREIGN PATENT DOCUMENTS

| | | |
|---|---|---|
| AT | 398862 B | 6/1989 |
| AT | 402133 B | 10/1992 |

(List continued on next page.)

OTHER PUBLICATIONS

Daihen, Inc. Air Plasma Cutting Systems. Brochure. Nov. 1997.

(List continued on next page.)

Primary Examiner—Matthew V. Nguyen
(74) Attorney, Agent, or Firm—George R. Corrigan

(57) ABSTRACT

A welding power supply includes an input rectifier that receives sinusoidal or alternating line voltage and provides a rectified voltage. A pre-regulator provides a dc bus and a convertor, such as a boost convertor, provided a welding output. The pre-regulator is an SVT (slow voltage transition) and an SCT (slow current transition) switched convertor. It may include a snubber circuit having a diode that is SVT switched. Also, the boost convertor may be SVT and SCT switched. The pre-regulator preferably includes a power factor correction circuit. The power source includes, in one embodiment, an inverter having a snubber circuit having a first switch in anti-parallel with a first diode, and a second switch in anti-parallel with a second diode. The first switch and first diode are connected in series with the second switch and the second diode, and the first and second switches are connected in opposing directions, to form a switched snubber.

19 Claims, 12 Drawing Sheets

U.S. PATENT DOCUMENTS

| | | | |
|---|---|---|---|
| 5,418,704 A | 5/1995 | Hua et al. |
| 5,438,498 A | 8/1995 | Ingemi |
| 5,477,131 A | 12/1995 | Gegner |
| 5,563,777 A | 10/1996 | Miki et al. |
| 5,570,279 A | 10/1996 | Venkataramanan |
| 5,574,636 A | 11/1996 | Lee et al. |
| 5,594,629 A | 1/1997 | Steigerwald |
| 5,598,326 A | 1/1997 | Liu et al. |
| 5,601,741 A | 2/1997 | Thommes |
| 5,615,101 A | 3/1997 | Moriarty |
| 5,636,114 A | 6/1997 | Bhagwat et al. |
| 5,654,880 A | 8/1997 | Brkovic et al. |
| 5,673,184 A | 9/1997 | Rilly et al. |
| 5,673,185 A | 9/1997 | Albach et al. |
| 5,673,186 A | 9/1997 | Johnson |
| 5,675,483 A | 10/1997 | Rademaker et al. |
| 5,691,890 A | 11/1997 | Hyde |
| 5,712,536 A | 1/1998 | Haas et al. |
| 5,714,731 A | 2/1998 | Ulrich et al. |
| 5,715,150 A | 2/1998 | Stava |
| 5,715,155 A | 2/1998 | Shahani et al. |
| 5,731,969 A | 3/1998 | Small |
| 5,734,562 A | 3/1998 | Redl |
| 5,740,022 A | 4/1998 | Abe |
| 5,742,495 A | 4/1998 | Barone |
| 5,748,457 A | 5/1998 | Poon et al. |
| 5,793,190 A | 8/1998 | Sahlstrom et al. |
| 5,811,757 A | 9/1998 | Higgins |
| 5,815,386 A | 9/1998 | Gordon |
| 5,841,268 A | 11/1998 | Mednik |
| 5,874,826 A | 2/1999 | Chen et al. |
| 6,021,053 A | 2/2000 | Baskette et al. |
| 6,052,294 A | 4/2000 | Jacobs et al. |
| 6,055,161 A | 4/2000 | Church et al. |
| 6,061,253 A | 5/2000 | Igarashi et al. |
| 6,115,273 A | 9/2000 | Geissler |
| 6,166,933 A | 12/2000 | Bowers |
| 6,169,671 B1 | 1/2001 | Mao |
| 6,266,257 B1 | 7/2001 | Geissler |
| 6,438,004 B1 | 8/2002 | Tanaka et al. |

FOREIGN PATENT DOCUMENTS

| | | |
|---|---|---|
| AT | 000464 U1 | 4/1994 |
| AT | PCT/AT99/00242 | 10/1998 |
| AT | PCT/AT99/00263 | 11/1998 |
| DE | 3134628 | 3/1983 |
| DE | 4029117 A1 | 3/1991 |
| DE | 4128175 A1 | 2/1993 |
| DE | 4211906 C1 | 6/1993 |
| DE | 19507649 A1 | 3/1994 |
| DE | 4431665 A1 | 3/1995 |
| DE | 19612319 A1 | 4/1995 |
| DE | 19634713 A1 | 8/1995 |
| DE | 4411227 A1 | 10/1995 |
| DE | 29724302 U1 | 1/2001 |
| DE | 20109760 U1 | 9/2001 |
| EP | 0408253 A2 | 1/1991 |
| EP | 0410088 B1 | 11/1992 |
| EP | 0608536 A1 | 1/1993 |
| EP | 0608536 B1 | 8/1994 |
| EP | 0547417 B1 | 6/1995 |
| EP | 704957 B1 | 1/1999 |
| GB | 2258958 A | 7/1991 |
| GB | 2258985 A | 2/1993 |
| GB | 0644011 | 8/1998 |
| JP | 06030558 | 2/1994 |
| WO | WO 99/63651 | 5/1998 |
| WO | WO 00/74888 A1 | 6/2000 |
| WO | WO 01/53030 A1 | 1/2001 |

OTHER PUBLICATIONS

Daihen, Inc., SW–101 "Fillet Butt" Portable Submerged Gas Metal Automatic Arc Welder. Nov. 1997 Brochure.

Daihen, Inc., D Series inverters MIG—TIG—STICK. Aug. 1997 Brochure.

Daihen, Inc. Turbo Pulse 350 DF/500DF Aug. 1997 Brochure.

Daihen, Inc. 350XSR, Economical Solid–State DC Constant Voltage Arc Welding Machine. Brochure (1997).

Daihen, Inc. MIG–135 DC Constant Voltage Spool–Gun arc Welding Machine. Brochure. (1997).

Daihen, Inc. MINI TIG 200P High Performance DC Inerter Pulse TIG (Stick) Welder. Brochure. (1997).

Daihen, Inc. TIGun Cold Wire TIG Spool–Gun. Brochure. (1997).

Daihen, Inc. Semi–Automatic CO2/MAG Welding Machine Inverter. Aug. 1997 Brochure.

EWM/High–Tech Precision. Brochure.

Fronius Perfect Welding—Transtig 2000/Magic Wave 2000. Brochure.

Official Proceedings if the Fourteenth International PCI '87 Conference, Sep. 14–17, 1987, Long Beach, CA.

State–Plane Analysis of Parallel Resonant Converter 1985 IEEE.

IECON '94 $20^{th}$ International Conference on Industrial Electronic, Control and Instrumentation Vol. 1 of 3 Plenary Session Power Electronics copyright 1994 by The Institute of Electrical and Electronics Engineers, Inc.

The Analyses of ZVS Turn–off Loss and the New Snubber Circuit for the ARCP inverter IEEE Mar. 1994.

Resonant Transition Switching Welding Power Supply Sep. 11, 1997, Institute for Power Electronics and Electrical drives.

FIG. 10
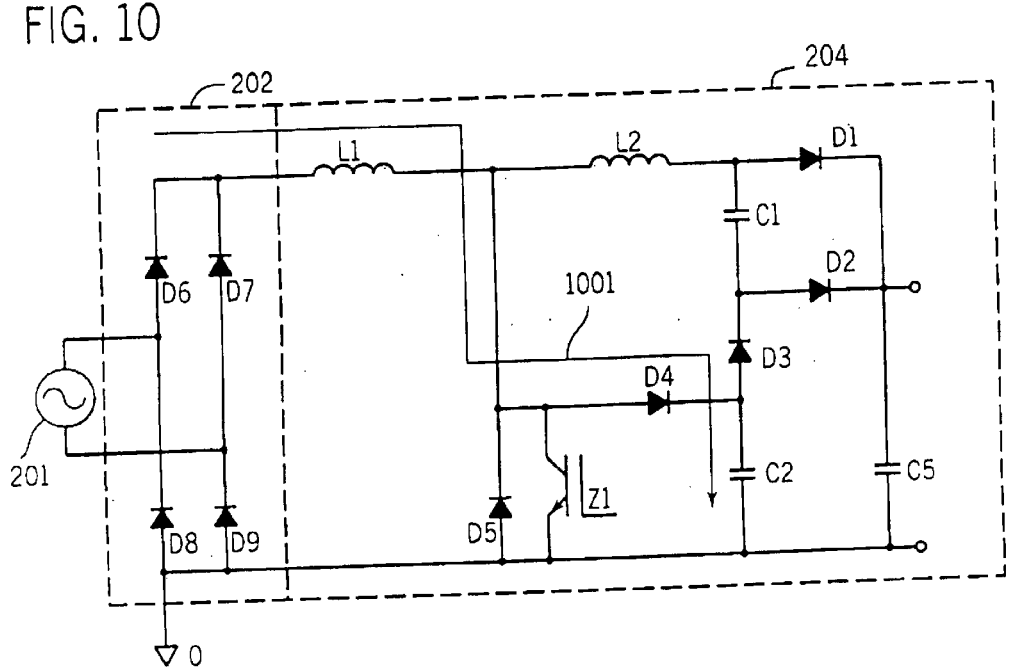
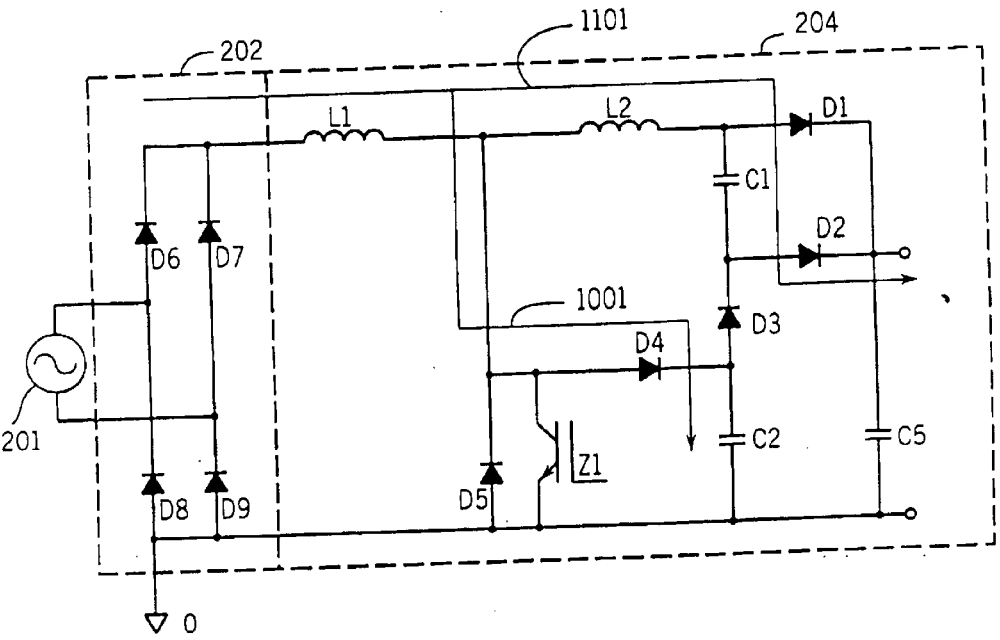
FIG. 11

FIG. 12
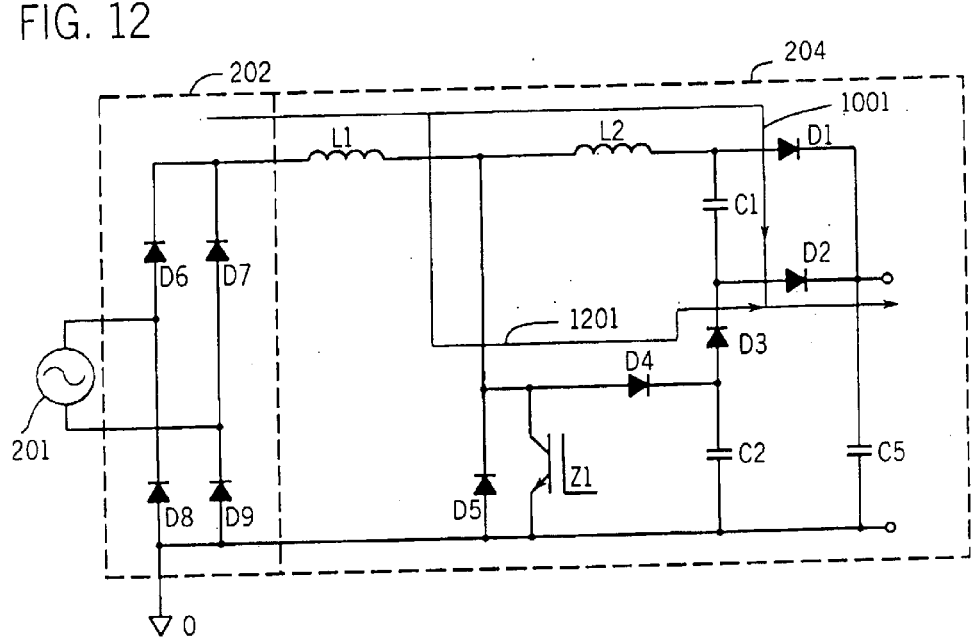
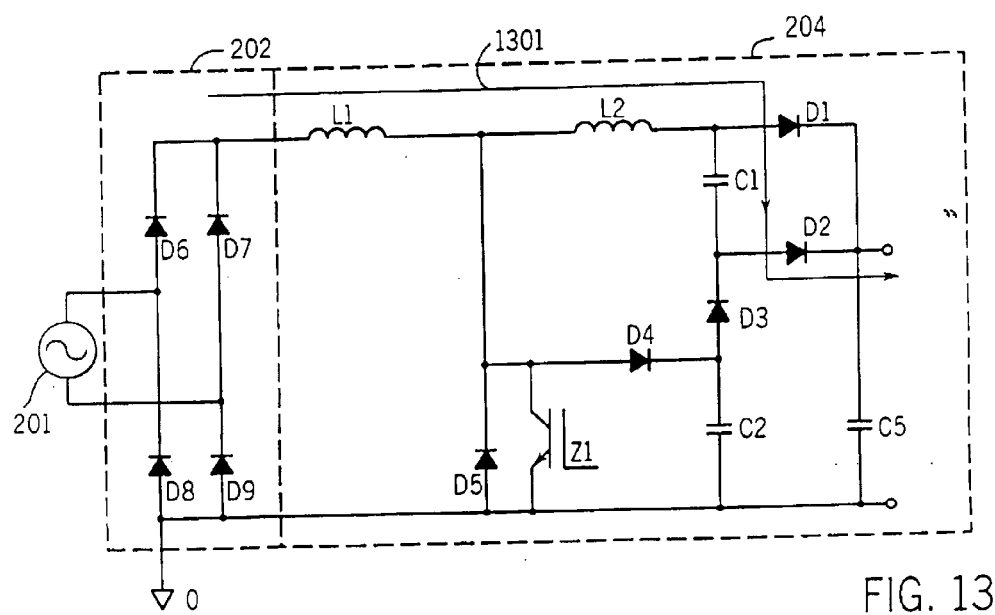
FIG. 13

POWER CONVERTOR WITH LOW LOSS SWITCHING

This is a continuation of, and claims the benefit of the filing date of, U.S. patent application Ser. No. 10/176,712, filed Jun. 20, 2002, now U.S. Pat. No. , 6,625,046, entitled Power Converter With Low Loss Switching, which is a continuation of, and claims the benefit of the filing date of, U.S. patent application Ser. No. 09/778,697, filed Feb. 7, 2001, now U.S. Pat. No. 6,426,888 entitled Power Converter With Low Loss Stitching, which is a continuation of U.S. patent application Ser. No. 09/495,969, filed Feb. 2, 2000, entitled Power Converter With Low Loss Switching, which issued Jul. 24, 2001 as U.S. Pat. No. 6,266,257, which is a divisional of, and claims the benefit of the filing date of, U.S. patent application Ser. No. 09/111,950, filed Jul. 9, 1998, entitled Power Converter With Low Loss Switching, which issued on Sep. 5, 2000 as U.S. Pat. No. 6,115,273.

FIELD OF THE INVENTION

This invention relates generally to power sources used in welding and, more particularly, to welding power sources that have a pre-regulator.

BACKGROUND OF THE INVENTION

Power sources typically convert a power input to a necessary or desirable power output tailored for a specific application. In welding applications, power sources typically receive a high voltage, alternating current, (VAC signal and provide a high current welding output signal. Around the world, utility power sources (sinusoidal line voltages) may be 200/208V, 230/240V, 380/415V, 460/480V, 500V and 575V. These sources may be either single-phase or three-phase and either 50 or 60 Hz. Welding power sources receive such inputs and produce an approximately 10–75 volt, DC or AC high current welding output.

There are many types of welding power sources that provide power suitable for welding, including inverter-based welding power sources. As used herein, an inverter-type power supply includes at least one stage where DC power is inverted into ac power. There are several well known inverter type power sources that are suitable for welding. These include boost power sources, buck power sources, and boost-buck power sources.

Traditionally, welding power sources were designed for a specific power input. In other words, the power source cannot provide essentially the same output over the various input voltages. More recently, welding power sources have been designed to receive any voltage over a range of voltages, without requiring relinking of the power supply. One prior art welding power supply that can accept a range of input voltages is described in U.S. Pat. No. 5,601,741, issued Feb. 11, 1997 to Thommes, and owned by the assignee of the present invention, and is hereby incorporated by reference.

Many prior art welding power supplies include several stages to process the input power into welding power. Typical stages include an input circuit, a pre-regulator, an invertor and an output circuit that includes an inductor. The input circuit receives the line power, rectifies it, and transmits that power to the pre-regulator. The pre-regulator produces a dc bus suitable for conversion. The dc bus is provided to the invertor of one type or another, which provides the welding output. The output inductor helps provide a stable arc.

The pre-regulator stage typically includes switches used to control the power. The losses in switches can be significant in a welding power supply, particularly when they are hard switched. The power loss in a switch at any time is the voltage across the switch multiplied by the current through the switch. Hard switching turn-on losses occur when a switch turns on, with a resulting increase in current through the switch, and it takes a finite time for the voltage across the switch to drop to zero. Soft switching attempts to avoid turn-on losses by providing an auxiliary or snubber circuit with an inductor in series with the switch that limits the current until the transition to on has been completed, and the voltage across the switch is zero. This is referred to as zero-current transition (ZCT) switching.

Similarly, hard switching turn-off losses also occur when a switch turns off, with a resultant rise in voltage across the switch, and it takes a finite time for the current through the switch to drop to zero. Soft switching attempts to avoid turn-off losses by providing an auxiliary or snubber circuit with a capacitor across the switch that limits the voltage across the switch until the transition to off has been completed, and the current through the switch is zero. This is referred to as zero-voltage transition (ZVT) switching.

There are numerous attempts in the prior art to provide soft-switching power converters or invertors. However, these attempts often either transfer the losses to other switches (or diodes) and/or require expensive additional components such as auxiliary switches and their control circuits. Thus, an effective and economical way of recovering (or avoiding) switching losses in power converters or inverters is desirable. Examples of various attempts at soft switching are described below.

U.S. Pat. No. 5,477,131, issued Dec. 19, 1995 to Gegner discloses a ZVT type commutation. However, a controlled auxiliary switch and a coupled inductor are needed to implement the ZVT. Also, the primary current is discontinuous.

Some prior art designs require discontinuous conduction mode for diode recovery. One such design is found in U.S. Pat. No. 5,414,613. This is undesirable because of excessive high frequency ripple in the power lines.

Gegner also disclosed a ZVS converter that operated in a multi-resonant mode in U.S. Pat. No. 5,343,140. This design produced relatively high and undesirable RMS current and RMS voltage.

Another multi-resonant converter is disclosed in U.S. Pat. No. 4,857,822, issued to Tabisz. This design causes undesirable high voltage stress during ZVS events and undesirable high current stress during ZCS events.

U.S. Pat. No. 5,307,005 also requires an auxiliary switch. Losses occur when the auxiliary switch is turned off. This merely shifts switching losses, rather than eliminating them. Other designs that "shift" losses are shown in U.S. Pat. Nos. 5,410,704 and 5,598,318.

A circuit that requires an auxiliary controlled is switch but does not "shift" losses to the auxiliary switch is shown in U.S. Pat. No. 5,313,382. This is an improvement over the prior art that shifted losses, but still requires an expensive controlled switch.

Another design that avoided "loss shifting" is shown in U.S. Pat. No. 5,636,144. However, that design requires a voltage clamp for recovery spikes, and 3 separate inductors. Also, the voltages on the inductors is not well controlled.

A zero-current, resonant boost converter is disclosed in U.S. Pat. No. 5,321,348. However, this design requires relatively complex magnetics and high RMS current in the switches and magnitudes. Also, a high reverse voltage is needed for the boost diodes.

When it is not practical or cost effective to use a true ZCT and ZVT circuit, an approximation may be used. For example, slow voltage/current transitions (SVT and SCT) as used herein, describe transitions where the voltage or current rise is slowed (rather than held to zero), while the switch turns off or on.

A typical prior art welding power supply 100 with a pre-regulator 104 and an output convertor or inverter 105 is shown in FIG. 1. An input line voltage 101 is provided to a rectifier 102 (typically comprised of a diode bridge and at least one capacitor). Pre-regulator 104 is a hard-switched boost converter which includes a switch 106 and an inductor 107. A diode 108 allows a capacitor 109 to charge up by current flowing in inductor 107 when the switch 106 is turned off. The current waveform in inductor 107 is a rectified sinusoid with high frequency modulation (ripple).

The amount of ripple may be reduced by increasing the frequency at which switch 106 is switched. However, as the frequency at which a prior art hard switched boost converter is switched is increased to reduce ripple, the switching losses can become intolerable.

Another drawback of some prior art power supplies is a poor power factor. Generally, a greater power factor allows a greater power output for a given current input. Also, it is generally necessary to have more power output to weld with stick electrodes having greater diameters. Thus, a power factor correction circuit will allow a given welding power supply to be used with greater diameter sticks for a given line power. A prior art inverter that provided a good power factor is disclosed in U.S. Pat. No. 5,563,777. Many prior art convertors with power factor correction suffer from high switching losses. Examples of such prior art designs are found in U.S. Pat. Nos. 5,673,184; 5,615,101; and 5,654,880.

One type of known output convertor is a half-bridge, transformer isolated, inverter. However, such output invertors often have high switching losses and/or require passive snubber circuits (which increases losses) because each snubber must operate in both directions overall, but only in one direction at a time. Also, known snubber circuits generally have a limited range of acceptable loads and will not snub proportional to the load, thus the losses are relatively high for lower loads.

Accordingly, a power circuit that provides little switching losses and a high (close to unity) power factor is desirable. Also, the pre-regulator should be able to receive a wide range of input voltages without requiring relinking. A desirable output convertor will include a full wave, transformer isolated, inverter, that is soft switch and has full range, full wave, low loss snubber.

SUMMARY OF THE PRESENT INVENTION

According to a first aspect of the invention a welding power supply includes an input rectifier that receives sinusoidal or alternating line voltage and provides a rectified sinusoidal voltage. A pre-regulator receives the rectified input and provides a dc bus. An invertor connected across the bus provides a welding output. The pre-regulator is an SVT (slow voltage transition) and an SCT (slow current transition) switched invertor.

In one embodiment the pre-regulator includes a snubber circuit having a diode that is SVT switched.

In another embodiment the inverter is a boost converter with a switch. The pre-regulator includes a snubber circuit having a capacitor and an inductor. The capacitor is connected to slow the switch voltage rise while the switch is turning off, and the inductor is connected to slow the switch current rise when the switch is turning on. The boost converter includes a boost inductor, a switch, and an output capacitor in another embodiment. Also, the snubber includes a snubber capacitor, a snubber inductor, a first snubber diode, a second snubber diode, a third snubber diode, a fourth stabber diode, and first and second snubber capacitors. The snubber inductor, switch, and fourth diode are connected such that current may flow from the boost inductor to any of the snubber inductor, switch, and fourth diode. Current flowing through the fourth diode can flow through either the third diode or the second capacitor. Current flowing from the boost inductor through the snubber inductor can flow through either the first diode or the first capacitor. The fourth diode and the second capacitor are connected across the switch and current flowing through the third diode can flow through either the first capacitor and the snubber inductor or through the second diode. Current flowing through the first and second diodes flows to the output. A fifth diode is connected in anti-parallel to the switch in one embodiment.

A second aspect of the invention is a method of providing welding power by rectifying a sinusoidal or alternating input line voltage end pre-regulating the sinusoidal input line voltage to provide a dc bus. The method further includes SVT and SCT switching a boost convertors. The bus is converted toga welding output.

Pre-regulating includes, in one embodiment, maintaining a boost converter switch off, and allowing current to flow through a boost inductor, a snubber inductor, and a first diode, to the dc bus, and turning the switch on and diverting current from the snubber inductor to the switch. Current is reversed in the snubber inductor and a second capacitor is discharged through a first capacitor, a third diode, and the snubber inductor, thereby transferring energy from the second capacitor to the snubber inductor. Current is diverted through a fourth diode, the third diode and the first capacitor when the second capacitor is discharged, thereby transferring energy from the snubber inductor to the first capacitor. The switch is turned off and current diverted through the fourth diode and into the second capacitor. Voltage on the second capacitor is allowed to rise until current begins to flow from the snubber inductor to the first capacitor and then current 15 diverted from the second capacitor through a third diode to the second diode. The current from the boost inductor to the snubber inductor increases until all of the current from the boost inductor flows into the snubber inductor. Then current is diverted from the first capacitor to the first diode. This process is repeated.

One embodiment includes SVT turning off a diode is a snubber circuit. Another includes slowing the switch voltage with a capacitor rise while the switch is turning off, and slowing the switch current rise with an inductor while the switch is turning on to SVT and SCT switching a boost convertor.

A third aspect of the invention is a welding power, supply having an input rectifier that provides a rectified voltage. A pre-regulator receives as an input the rectified signal and provides a dc bus. An invertor converts the bus to a welding output and the pre-regulator includes a power factor correction circuit.

Yet another aspect of the invention is a welding power supply having an input rectifier and a preregulator and an invertor. The pre-regulator includes a snubber circuit having a first switch in anti-parallel with a first diode, and a second switch in anti-parallel with a second diode. The combination of the first switch and first diode are connected in series with the combination of the second switch and the second diode, and the first and second switches are connected in opposing directions.

Another aspect of the invention is a welding power supply having an inverter with first and second current paths through a transformer, each in a unique direction. The first current path includes at least a first switch with an anti-parallel first diode and the second current path through the transformer in a second direction, the second current path including at least a second switch with an anti-parallel second diode. A snubber includes a current path having a third switch with an anti-parallel third diode, a fourth switch with an anti-parallel fourth diode. The third switch and anti-parallel diode are in series with, and oppositely directed from, the fourth switch and anti-parallel diode. The snubber also has a at least one snubber capacitor.

In alternative embodiments the first and second switches are in a half-bridge configuration or full bridge configuration. Also, the snubber capacitor may be split into two capacitors.

Another aspect of the invention is a method of providing welding power by turning on a first power switch and a first snubber switch, and allowing current to flow through the first power switch, a first dc bus, a first power capacitor, and in a first direction through a transformer. Then the first power switch is turned off and current flows through the first snubber switch, a second snubber diode, a snubber capacitor, and through the transformer in the first direction, while the first power switch is turning off, to provide a slow voltage transition off. Then current flows through a second anti-parallel power diode, a second DC bus, a second power capacitor, and through the transformer in the first direction, while the first power switch is continuing to turn off, to continue providing a slow voltage transition off. The first snubber switch is also turned off. After the system is at rest a second power switch on and a second snubber switch are turned after the first power switch is off, and current flows through the second power switch, the transformer ir a second direction, the second power capacitor, and the second bus. The second power switch is turned off and current flows through the second snubber switch, a first snubber diode, the transformer in the second direction, and a snubber capacitor, while the second power switch is turning off, to provide a slow voltage transition off. Then current flows through a first power diode, the transformer in the second direction, and the first power capacitor, while the second power switch is turning off, to provide a slow voltage transition off. The second snubber switch is also turned off, and the process is repeated.

Other principal features and advantages of the invention will become apparent to those skilled in the art upon review of the following drawings, the detailed description and the appended claims.

BRIEF DESCRIPTION OF THE DRAWINGS

FIGS. 5–13 are the circuit diagram of FIG. 4, showing various current paths;

Figure 1:
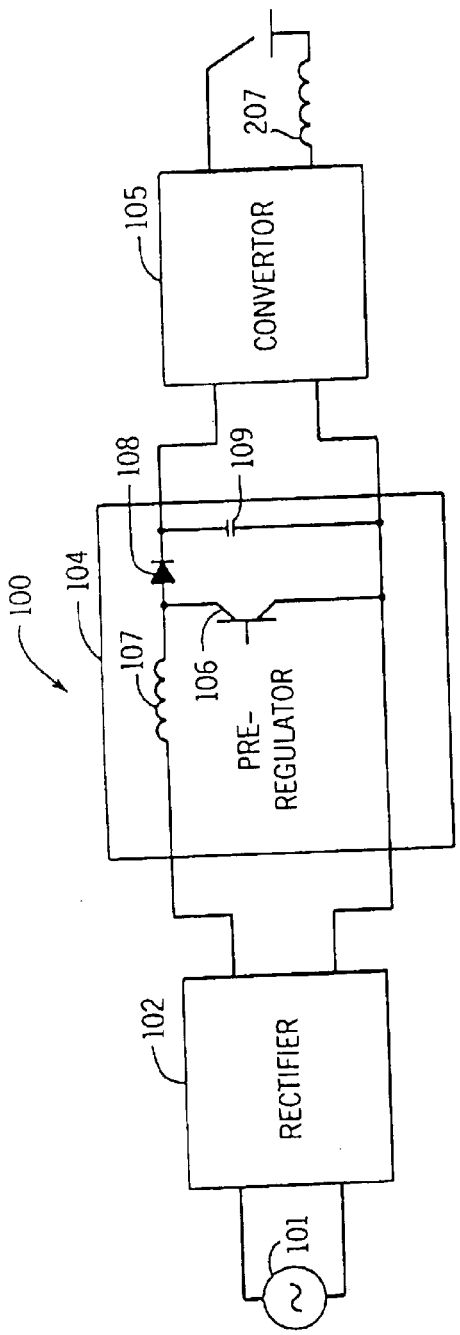
FIG. 1 is a circuit diagram of a prior art welding power supply having a boost convertor pre-regulator.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a welding power supply using a boost converter for a pre-regulator and particular circuitry, it should be understood at the outset that other circuit topologies may be used, and the power supply may be used for other purposes, and still be within the intended scope of this invention.

Figure 2:
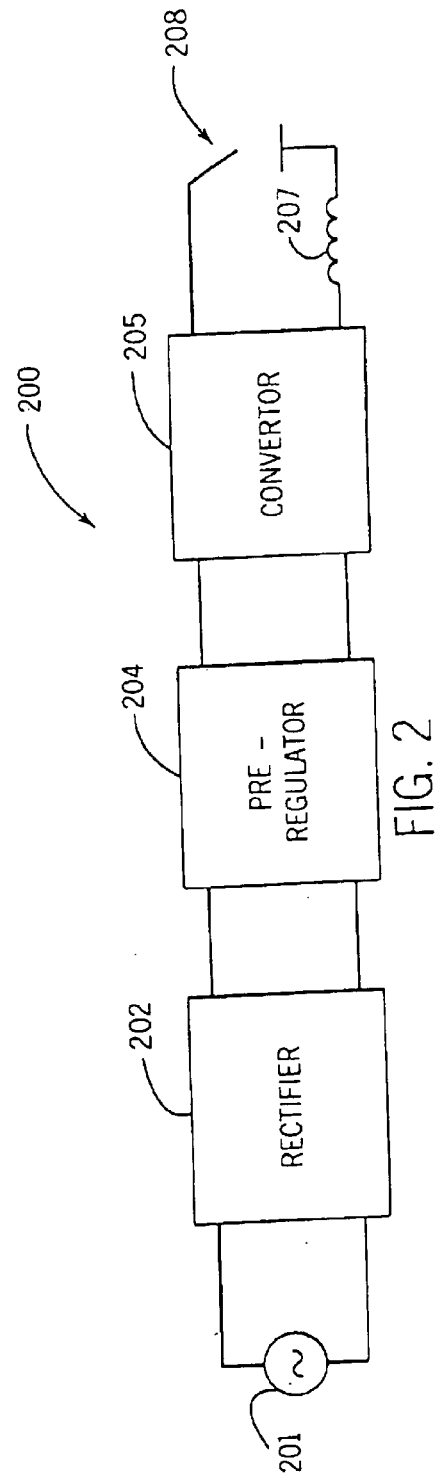
FIG. 2 is a block diagram of a welding power supply constructed in accordance with the present invention.

A block diagram of a welding power supply constructed in accordance with the preferred embodiment is shown in FIG. 2. Source 201 represents the input line voltage used to provide power to the welding power supply. The input line voltage may be anywhere between 90 and 250 volts in the preferred embodiment. The voltage typically operates at a frequency of 60 hertz (in the United States) and is single phase in the preferred embodiment (although alternative embodiments use a three phase input). Other voltages may also be used.

The input voltage is provided to a rectifier 202, which may be a simple bridge rectifier. The output of rectifier 202 is a rectified sinusoid.

A pre-regulator 204 receives the rectified sinusoid from rectifier 202 and provides a dc bus output to an output invertor 205. Pre-regulator 204, in the preferred embodiment is a soft-switch boost convertor which provides close to a unity power factor. Other convertor and invertor configurations may be used. Pre-regulator 204 also allows the input voltage to be anywhere within a range of input voltages in the preferred embodiment.

Convertor 205 is preferably a half-bridge, transformer isolated, soft (or slow) switched invertor. Such an output circuit will be described in detail below. Output convertor 205 may alternatively be a typical forward convertor (generally a buck convertor and a transformer), and other output converters may be used in other embodiments. A circuit including an output buck convertor is described in a U.S. patent application entitled Auxiliary Open Circuit Voltage Power Supply, invented by Vogel and Geissler, filed on even date herewith, (hereby incorporated by reference) and assigned to the assignee of this invention. The output of convertor 205 is provided through an inductor 207 to welding output 208.

Figure 4:
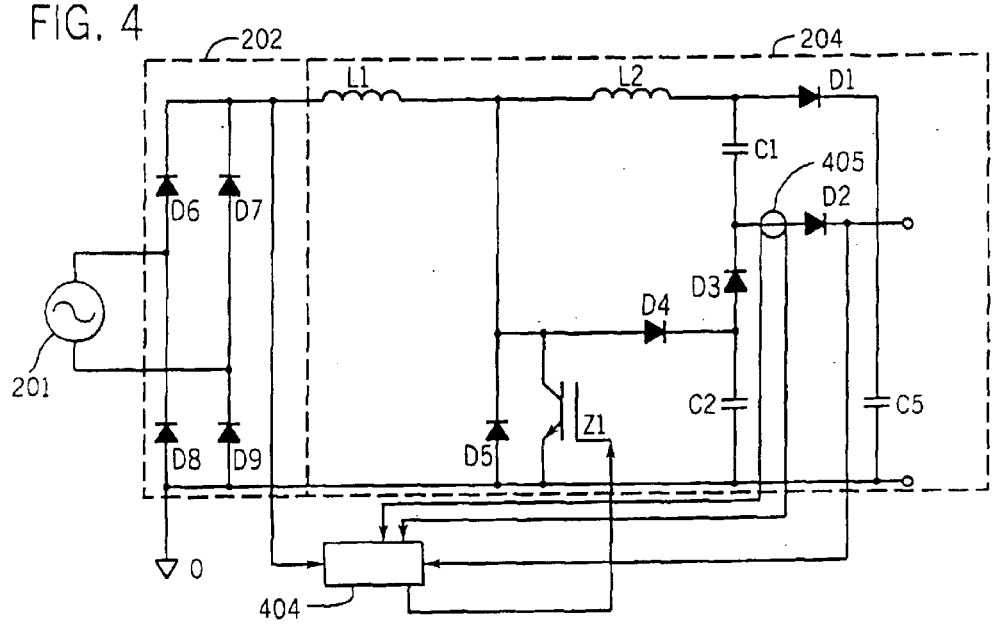
FIG. 4 is a circuit diagram of the pre-regulator of FIG. 2.
Figure 5:
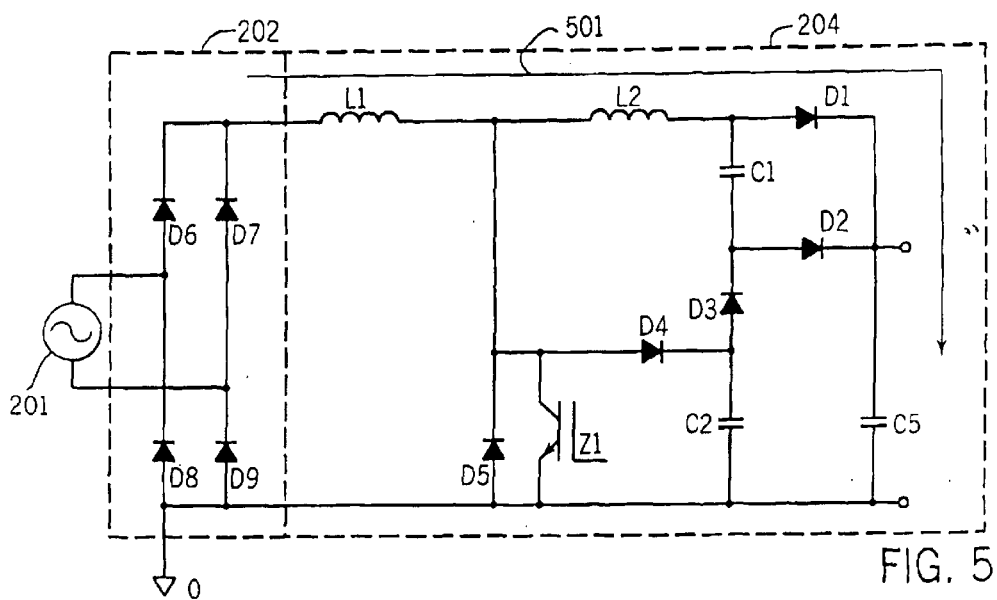

The circuit used in the preferred embodiment to implement pre-regulator 204 is shown in FIG. 4 (along with rectifier 202 and voltage source 201). The embodiment of FIG. 4 uses a 90–250 volt ac power line as input voltage 201. Rectifier 202 is comprised of diodes D6, D7, D8, and D9, which rectify the input voltage to provide a single polarity sinusoidal input voltage.

The power factor correction portion (described below) of pre-regulator 204 functions best when the input voltage is sinusoidal, although it could be another alternating input. Thus, a small (10 μF) capacitor (not shown) its provided across input rectifier 202 in one embodiment to smooth the input line voltage.

The rectified input voltage is applied to a boost inductor L1 (750 μH) which is connected with a boost switch. Z1 (preferable an IGBT) to form a boost convertor. An anti-parallel diode D5 is connected across switch Z1 to protect switch Z1 during transitions. The portion of the circuit which provides the lossless switching includes a snubber inductor L2 (3.9 μH) a pair of capacitors C1 (1 μF) and C2 (0.068 μF), and diodes D1, D2, D3, and D4. Switch Z1 is switched in a known manner such that the output of pre-regulator 204 is a desired voltage, no matter what the input voltage is. The output is provided across a capacitor C5 (2000 μF) that provides a stable voltage source (400 volts in the preferred embodiment) for the downstream convertor. Also, capacitor C5 prevents the voltage from being dangerously high and damaging switch Z1.

The soft switching of pre-regulator 204 is best understood with reference to FIG. 5–11, which show the circuit with various current paths (states). The first state (FIG. 5) is when switch Z1 is off, and the current (arrow 501) is in a steady state condition through inductors L1, and L2, and diode D1, to charge output capacitor C5 (arrow 501).

Figure 6:
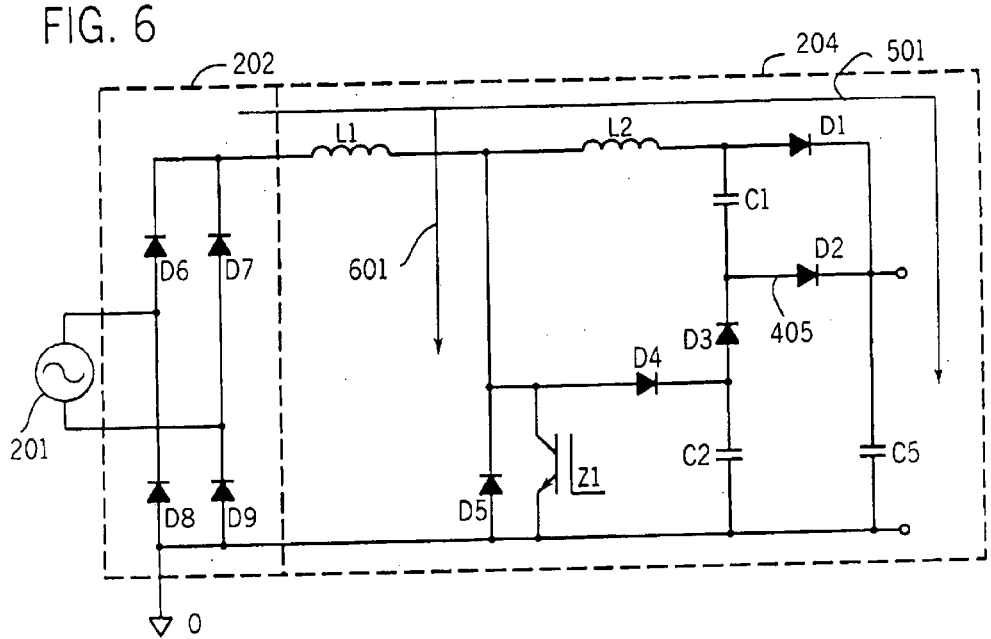

Then, switch Z1 is turned on, and current from inductor L1 begins to be directed through switch Z1 (arrow 601 of FIG. 6). Switch Z1 applies a reverse voltage to inductor L2, causing its current to fall. Thus, the current (in this state) is decreasing through inductor L2 and increasing through switch Z1. Inductor L2 effectively limits or slows the current in switch Z1 at turn on until the switch voltage drops (to close to zero). Thus, the turn on has been a slow-current transition (SCT).

Figure 7:
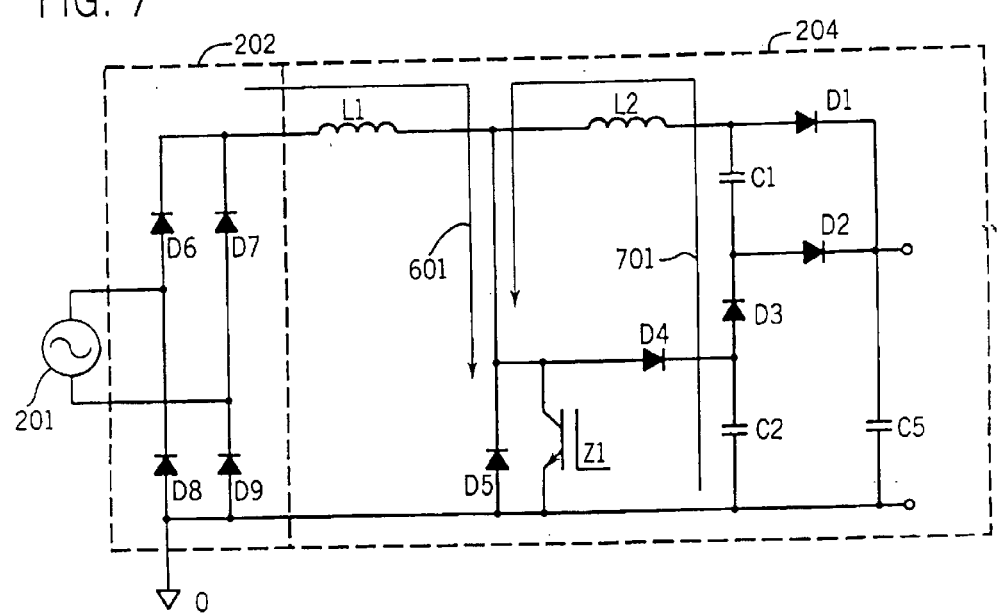

Eventually all of the current from inductor L1 flows through switch Z1, and current in inductor L2 drops until it becomes zero, and then reverses. Capacitor C2 discharges through capacitor C1, diode D3, and inductor L2, as shown in FIG. 7, by arrow 701. Capacitors C1 and C2 allow diode D1 to turn off with a SVT, thus reducing losses. The discharge occurs at a resonant frequency determined by the time constant of the inductance of inductor L2 and the series capacitance of capacitors C1 and C2 (f=1/(2n√(L2*(C1*C2/C1+C2)). The time it takes for capacitor C2 to discharge is the SVT time for diode D1.

Figure 8:
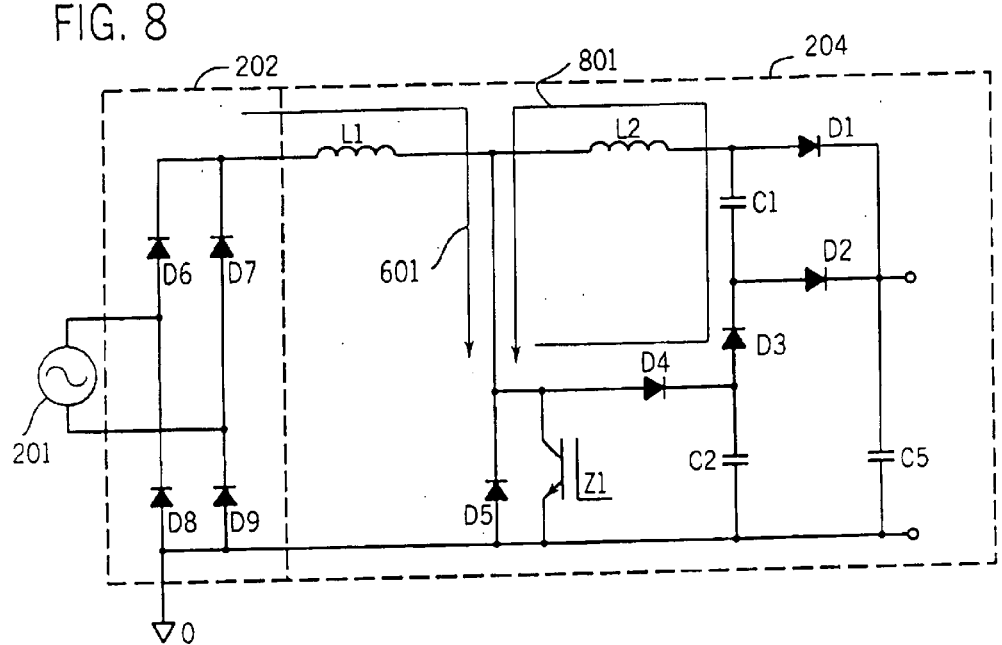

Capacitor C2 discharges to about zero volts, and diode D4 begins to conduct, as shown by arrow 801 in FIG. 8. When diode D4 conducts, inductor L2 releases the energy stored therein to capacitor C1 at a resonant frequency determined by inductor L2 and capacitor C1 (f=1/(2n√(L2*C1))). The voltage energy on capacitor C1 is transferred to current in inductor L2, and then to voltage on capacitor C1. The ratio of voltage transfer is nearly equal to the capacitance ratio.

Figure 9:
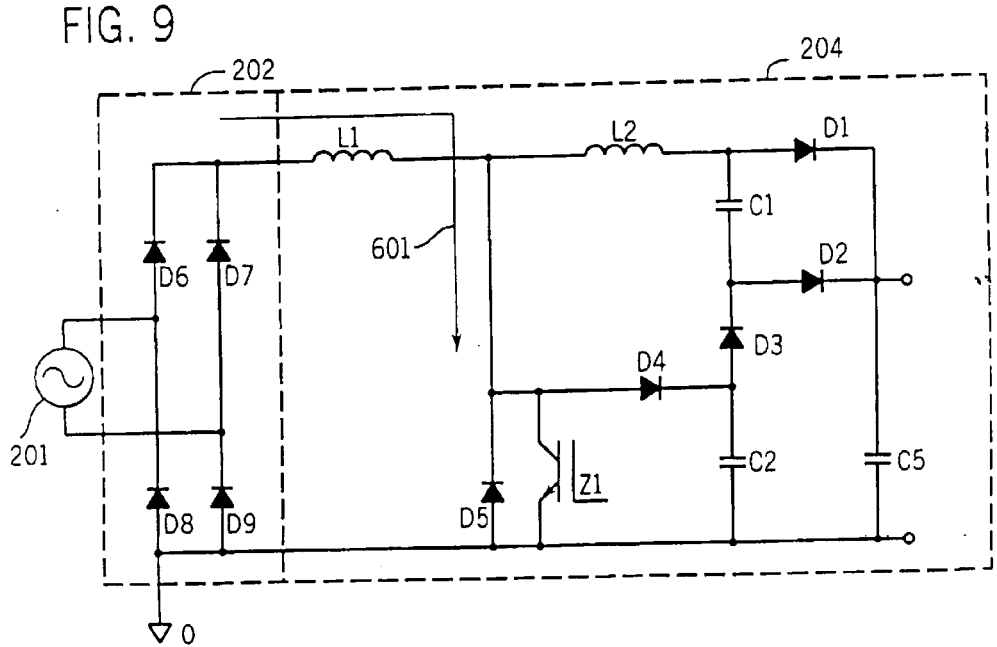

When the charge transfer is complete, and current ceases to flow in snubber inductor L2, the snubber is reset and current in inductor L1 increases through switch Z1, as shown in FIG. 9. The circuit remains in this state until the switch is turned off.

Next, switch Z1 is turned off, (FIG. 10) and current is diverted through diode D4 and into capacitor C2 (arrow 1001). Capacitor C2 provides the SVT time for switch Z1, thus a soft switching off is provided. The voltage on capacitor C2 continues to rise and eventually reaches the bus voltage (the voltage on capacitor C5) less the voltage on capacitor C1.

When this happens the voltage on capacitor C1 begins to reestablish the current in inductor L2 (FIG. 11 and arrow 1101). The voltage on capacitor C2 continues to rise until it reaches the bus voltage plus two diode drops. At that time current from inductor L1 not taken by inductor L2 is diverted through diode D3 FIG. 12 and arrow 1201). The voltage on capacitor C1 continues to increase the current in inductor L2.

Eventually all of the current from inductor L1 flows through inductor L2, and current through diodes D3 and D4 ceases (FIG. 13). Capacitor C1 continues to give energy to the bus.

When all of the energy on capacitor C1 is expended (to the bus) current flows from inductor L1 to inductor. L2, and through diode D1. This is the state initially described, with respect to FIG. 5, and the cycle repeats.

Thus, the voltage rise across switch Z1 was slowed by capacitor C2 to allow the current to drop when switch Z1 was turned off. The current rise in switch Z1 was slowed by inductor L2 to allow the voltage to drop, when switch Z1 was turned on. Moreover, diode D1 was soft-switched by capacitors C1 and C2.

The portion of pre-regulator 204 that provides power factor correction is a power factor correction circuit 404 (FIG. 4), and generally senses the input voltage waveform, and conforms the shape of the current waveform to be that of the line voltage waveform. This provides a power factor of very close to 1, 0.99 in the preferred embodiment. Power factor correction circuit 404 may be implemented using an integrated circuit, such as a UC3854 or an ML4831, or with discrete components. Power factor correction circuit 404 receives as inputs the output voltage from rectifier 202, the output voltage from pre-regulator 204, and the output current of pre-regulator 204 (using a CT 405). Because the frequency of pre-regulator 204 (25 KHz) is much higher than that of the line (60 Hz) the pre-regulator current can be made to track the input line voltage shape by sensing the shape of the input voltage, and controlling the input current in response thereto.

Figure 3:
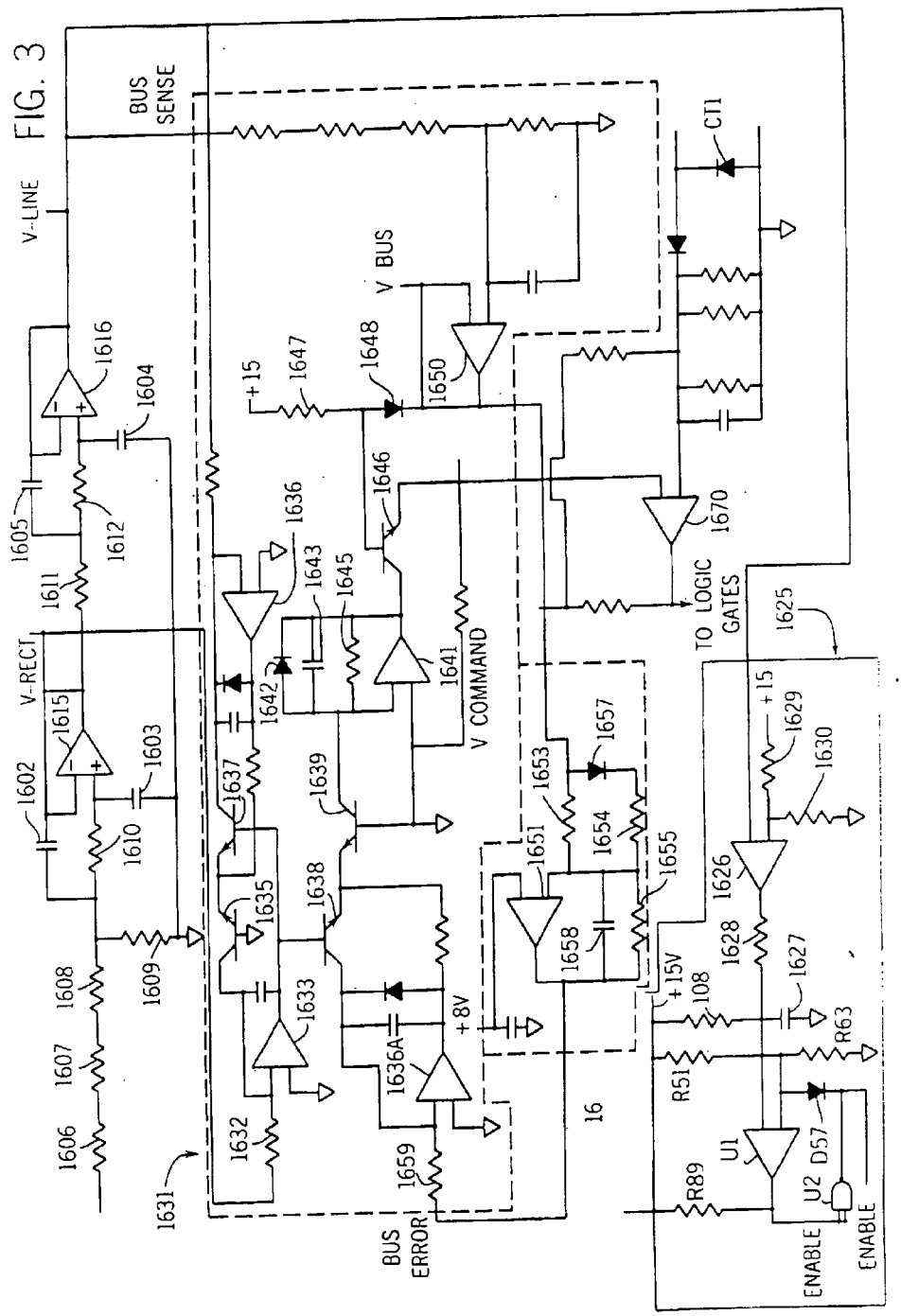
FIG. 3 is a circuit diagram of a power factor correction circuit used in the preferred embodiment.

An embodiment of power factor correction circuit 404 having discreet components is shown in FIG. 3 controls the switches so that the input current is shaped to match the input voltage, as well as regulates the DC bus.

The input voltage is rectified and provided to a 2 pole Bessel filter which removes switching frequencies. The Bessel filter includes capacitors 1602 (0.0022 μF and 1603 (0.001 μF), resistors (1606–1608 (1 M ohms), resistors 1609–1610 (39.2 K ohm), and an op amp 1615. The output of the Bessel filter (V-RECT) is provided to a low pass filler (approximately 2 Hz), which includes resistors 1611 and 1612 (68.1 K ohms), capacitor 1604 (0.22 μF), capacitor 1605 (47 μF), and op amp 1616. The output of op amp 1616 gives an average of the input line voltage (V-LINE).

V-LINE is provided to a typical precharge circuit 1625 which sets a delay before the electrolytic capacitors in the power supply precharge. An op amp 1626, and resistors 1629 (100 K ohms) and 1630 (10 K ohms) don't allow a capacitor 1627 (10 μF) to charge through a resistor 1628 (100 ohms) until the line voltage reaches a threshold. After the line voltage reaches the threshold capacitor 1627 charges to a level where it turns on a relay (not shown) through associated components including a resistor R63 (200 K ohms), a resistor R51 (100 K ohms), a resistor R108 (619 K ohms), an op amp U1, a diode D57, a NAND gate U2, and a resistor R89 (4.7 K ohm). These components operate in a typical fashion. The relay energizes and fires an SCR that precharges the electrolytic capacitors.

A multipliers/divider 1631 of receives the rectified line voltage signal, and divides that by the average input (typically either 230 or 460) so that a scaled rectified voltage is provided. Then the scaled, is rectified voltage is multiplied by an error signal from the bus to produce a reference command. Specifically, V-RECT, the output of op amp 1615 which corresponds to the rectified input voltage, is provided through a resistor 1632 (100 K ohms) and an op amp 1633 as one channel input to the multiplication. The other channel input to the multiplication is a BUS-ERROR signal provided through an op amp 1636A.

The output of op amp 1633 is provided through a log transistor 1635, and the average line voltage (V-LINE) is provided through an op amp 1636 and to a log transistor 1637. The common junction between transistors 1635 and 1637 is a subtraction, so the base of transistor 1637 is the result of the subtraction. That difference is added through a transistor 1638 to the bus error. The sum is provided to a transistor 1639, which takes the anti-log of that value. Thus, a division and multiplication are performed. The output is scaled by an op amp 1641 and associated circuitry including a diode 1642, a capacitor 1643 (0.0001 µF), and a resistor 1645 (20 K ohms).

A transistor 1646 limits the output current of op amp 1641, and is controlled by a resistor 1647 (20 K ohms) and a diode 1648. The input to op amp 1650 is a scaled bus voltage, and sets the maximum output command. The output command (VCOMM) is used to force the current shape to match the input voltage shape.

The BUS-ERROR signal is provided-by a typical error circuit which includes an op amp 1651 and associated circuitry resistors 1653 (20 K ohms), 1654. (11 K ohms), and 1655 (499 K ohms), a diode 1657 and a capacitor 1658 (0.047 µF). An 8 volt reference signal is compared to the divided down (and scaled) 800 volt bus. An error signal is provides through a resistor 1659 (82.5 K ohms) to op amp 1636A commanding an increase or decrease in the current to increase or decrease the bus voltage. Also, the current command is adjusted by the shape of the input signal as provided through V-RECT to mimic the shape of input rectified signal. Therefore, the current needed to result in a desired bus voltage is provided, but in such a shape that a power factor very close to one is obtained.

The command signal is summed with a current feedback signal from a CT1 by an op amp 1670 and provided to a boost drive circuit through logic gates (not shown) to turn on and off the IGBT in the preregulator. A CT is used to provide current feedback (rather than an LEM for example) because if a LEM fails it will call for unlimited current.

The boost drive signal is a digital signal of either zero (IGBT ON) or fifteen volts (IGBT OFF). The boost drive input is provided to the base of a pair of transistors and because the logic gates output do not provide enough current to drive the IGBT'S. Thus, the transistors provide sufficient current. A transistor level shifts. The gates of a pair of transistors are tied together by a capacitor (0.1 µf).

Figure 14:
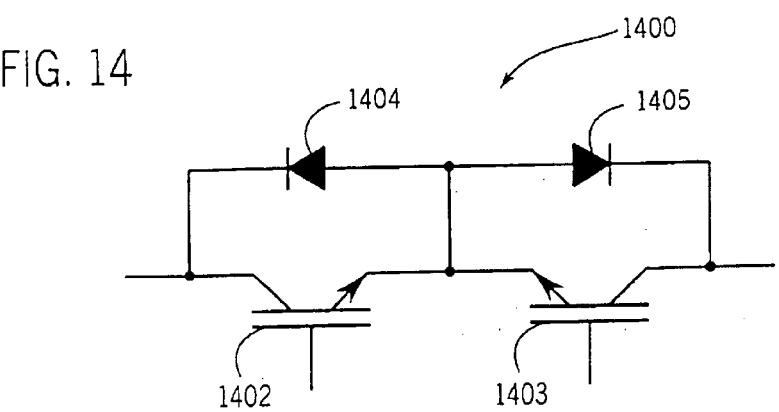
FIG. 14 is a circuit diagram of a switching circuit.

Another aspect of this invention is implemented with a half-bridge, transformer isolated, inverter that is SVT switched. The invertor uses a switch circuit 1400, shown in FIG. 14, that includes a pair of switches or IGBT's 1402 and 1403, and a pair of diodes 1404 and 1405. Diode 1404 is an anti-parallel diode for switch 1402. Diode 1405 is an anti-parallel diode for switch 1403. The two switch/diode parallel combinations are in series, but reversed, i.e. in opposing directions. This configuration provides a diode-type switch whose direction can be reversed.

Figure 15:
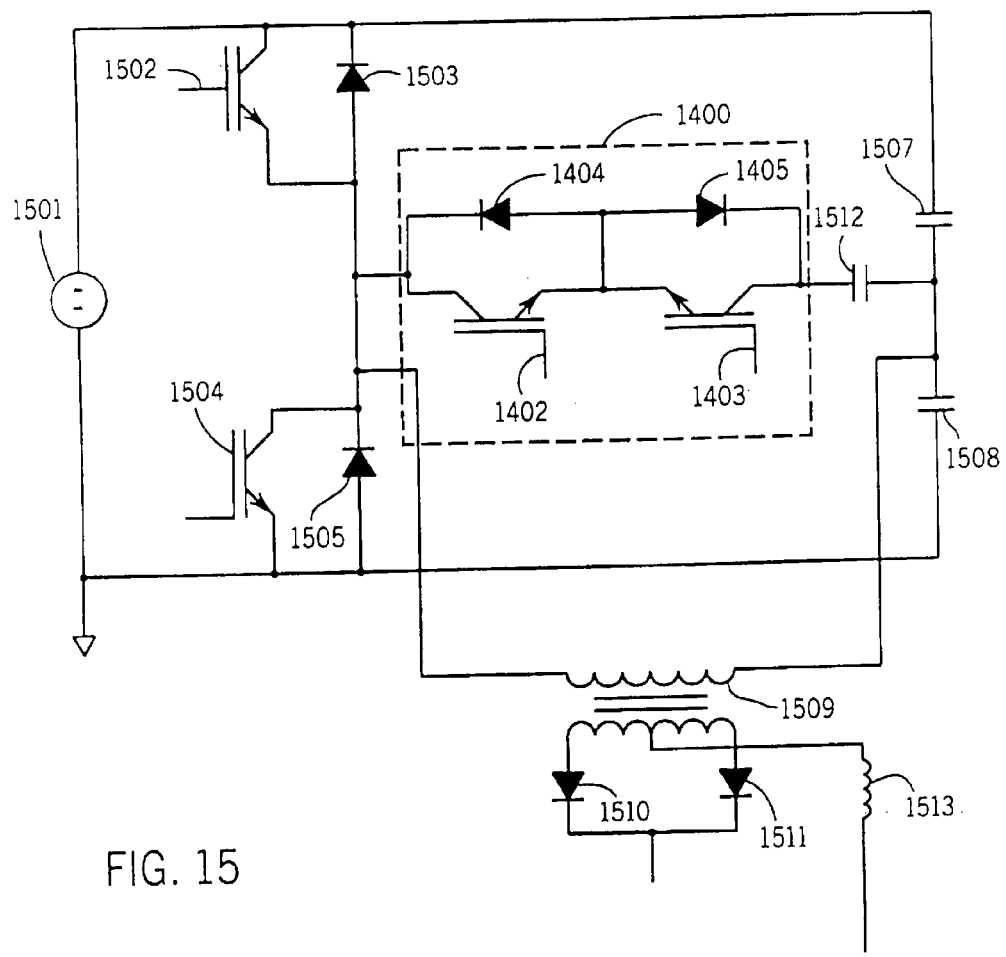
FIG. 15 is a full wave inverter using the switching circuit of FIG. 14.

An invertor using switch circuit 1400 is shown ir. FIG. 15, and includes a dc voltage source 1501, a pair of switches 1502 and 1504, with a pair of anti-parallel diodes 1503 and 1505, a pair of capacitors 1507 and 1508 (1410 µF), a transformer 1509, a capacitor 1512 (0.099 µF), an output rectifier including diodes 1510 and 1511, and an output inductor 1513.

Capacitor 1512 is switched across transformer 1509 by switches 1502 and 1504. Switches 1402 and 1403 are used to soft switch switches 1502 and 1504. Switches 1402 and 1403 do not need any special timing, and run with the main clock at effectively 50% duty cycle. For example, switches 1502 and 1402 turn on together, and switch 1502 delivers current to transformer 1509, while switch 1402 does nothing. When switch 1502 turns off, switch 1402 remains on, and current is directed through switch 1402 and diode 1405 into capacitor 1512, thus giving an SVT (Slow Voltage Transition) turn off. Switch 1402 is turned off after the transition and diode 1405 prevents the back flow of current from capacitor 1512. This occurs in complimentary fashion with switches 1502 and 1402 and diode 1405. Thus, this circuit provides full-wave transformer usage, PWM control, complete capacitor balance control with no extra circuitry, and efficient use of switches with SVT.

Referring now to FIGS. 17–24, the various current paths followed during a complete cycle are shown. The circuit in these Figures is an alternative embodiment that includes splitting capacitor 1512 into two capacitors, one connected to the upper bus, and one connected to the lower bus. This is done because the path through capacitors 1507 and 1508 can reduce the effectiveness of the snubber substantially.

Figure 17:
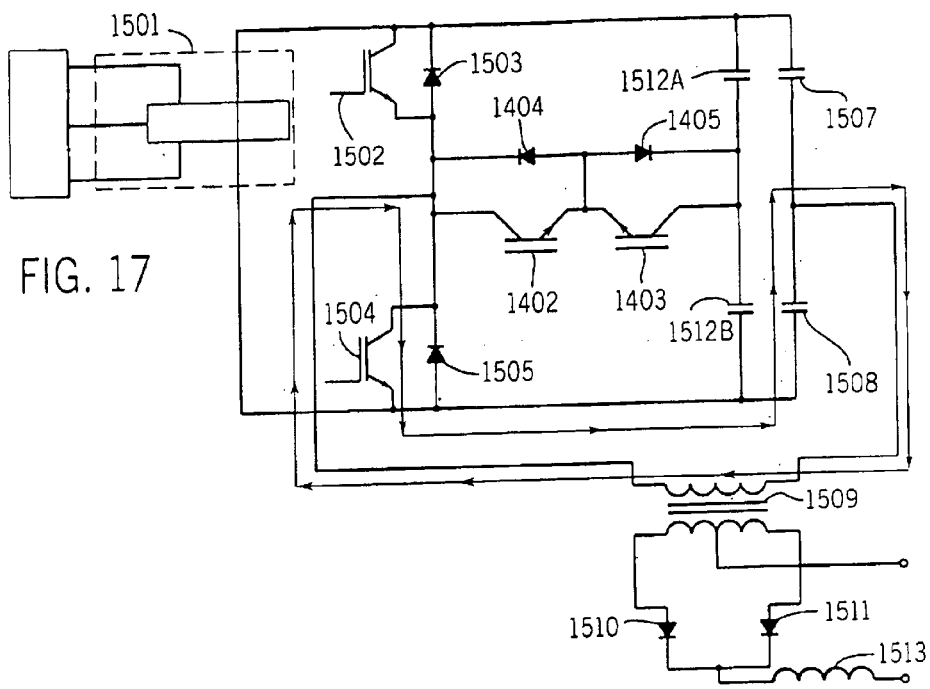
FIGS. 17–22 are the circuit diagrams of FIG. 15 showing various current path.

Initially, all of the switches are off in the snubber, and capacitors 1512A and 1512B split the bus. The 800 volts bus is also split by capacitors 1507 and 1508 (for half bridge operation). Capacitors 1507 and 1508 should be large enough to keep the junction voltage between them substantially constant during operation. Switches 1504 and 1402 are turned on together. Switch 1504 delivers power to transformer 1509 while switch 1402 is blocked by diode 1404. Thus, switch 1402 is in "standby" until switch 1504 turned off, as shown in FIG. 17.

Figure 18:
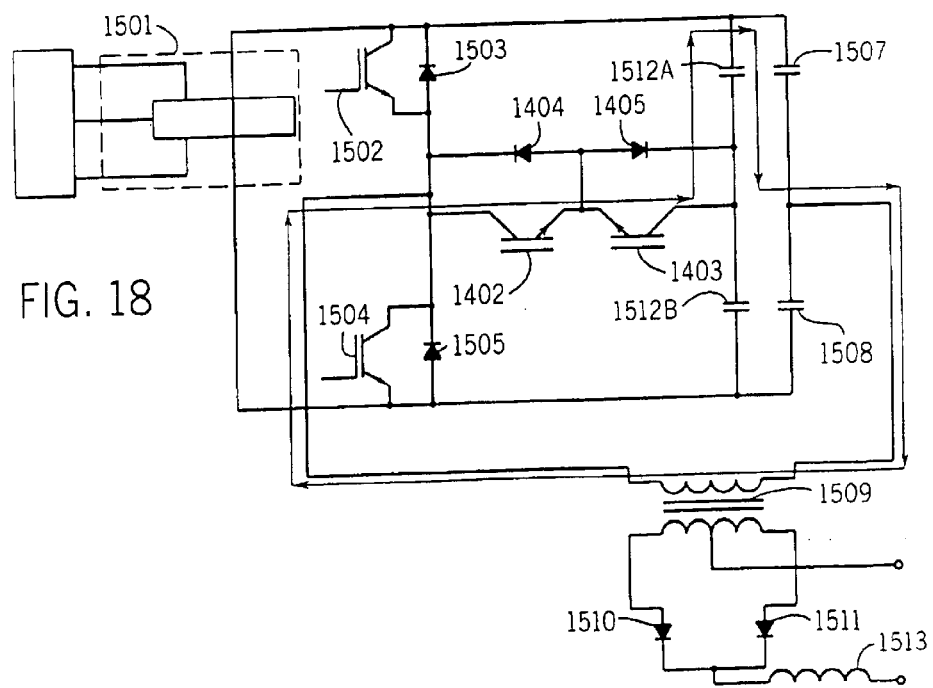

Switch 1504 turns off, and the current through the transformer transfers to switch 1403, diode 1404 and capacitor 1512 (which form the snubber path). The voltage across switch 1504 rises slowly giving a slow voltage transition. This current path is shown in FIG. 18.

Figure 19:
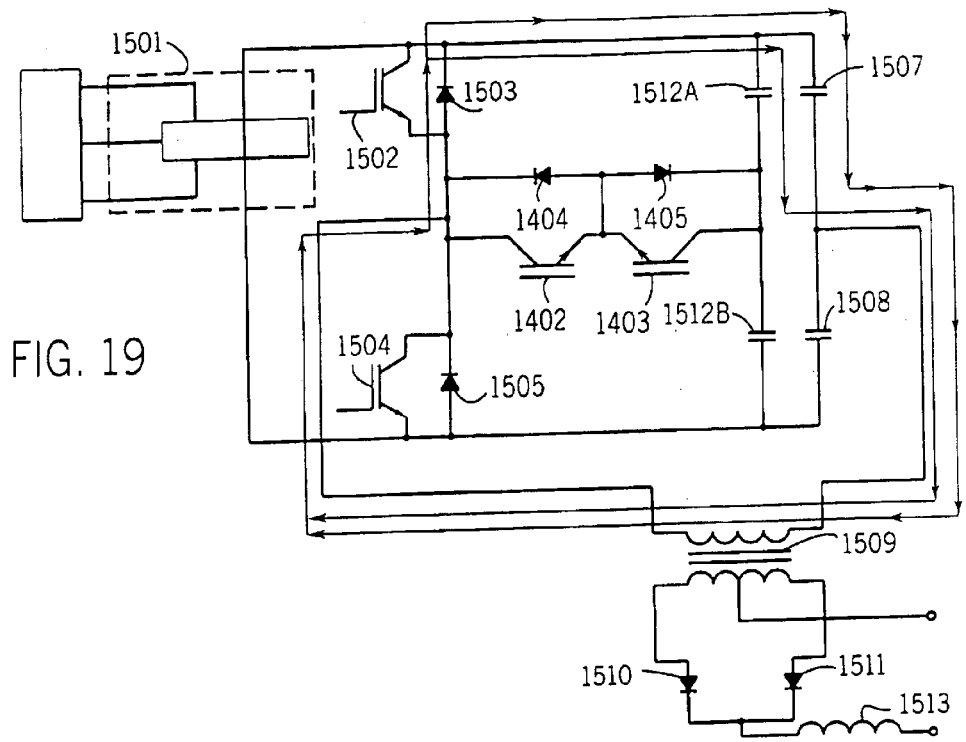

When the voltage across switch 1504 reaches the bus voltage, the remaining energy from transformer 1509 is spilled back into the bus through diode 1503. This current path is shown in FIG. 19. When the remaining energy and transformer 1509 has been provided to the bus the system comes to rest with snubber capacitor 1512 fully charged to completely soft switch 1502 (FIG. 15).

Figure 20:
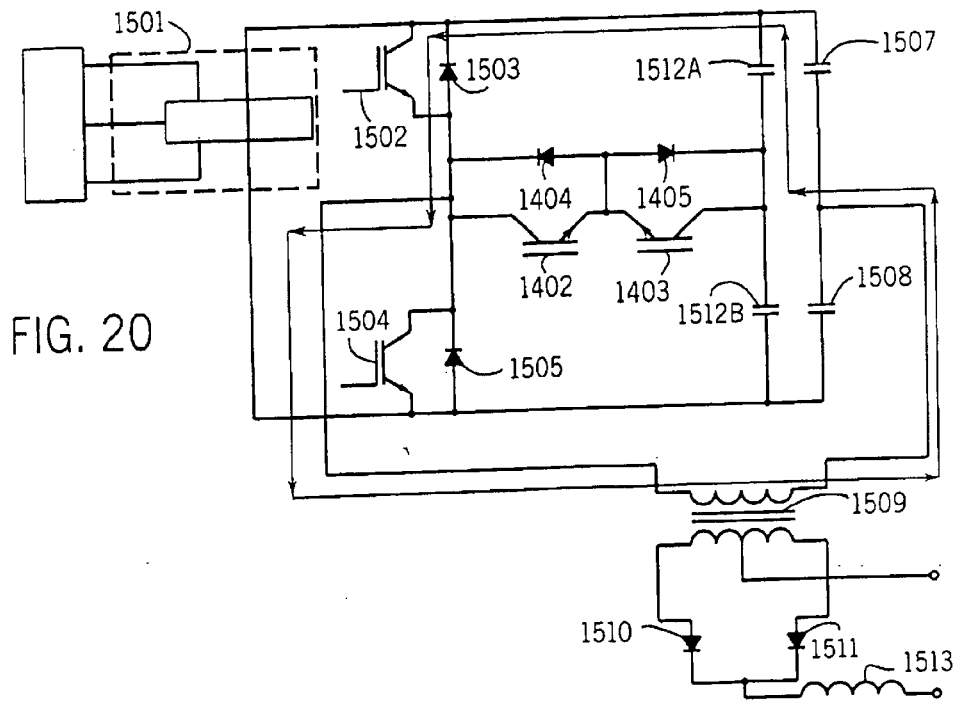
Figure 21:
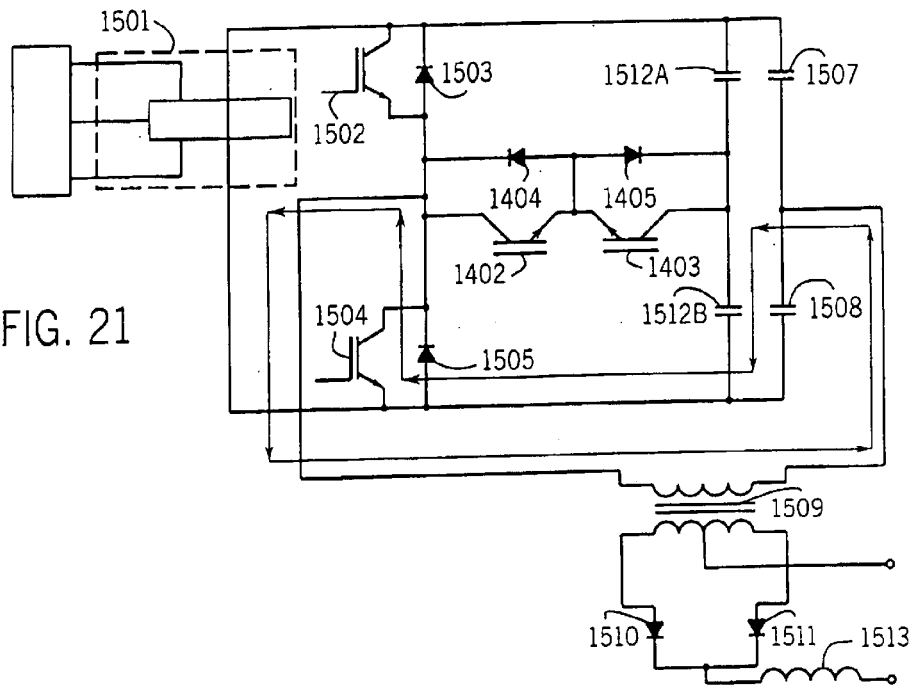

After the system comes to rest switches 1502 and 1403 are turned on together. Switch 1502 delivers power to transformer 1509 while switch 1403 is blocked by diode 1404. Thus, switch 1403 is in standby until switch 1502 is turned off (FIG. 20).

Switch 1502 is turned off and current from transformer 1509 transfers to capacitor 1512 through the snubber path including diode 1404 and switch 1403 rises slowly, giving a slow voltage transition. This current path is shown in FIG.

Figure 22:
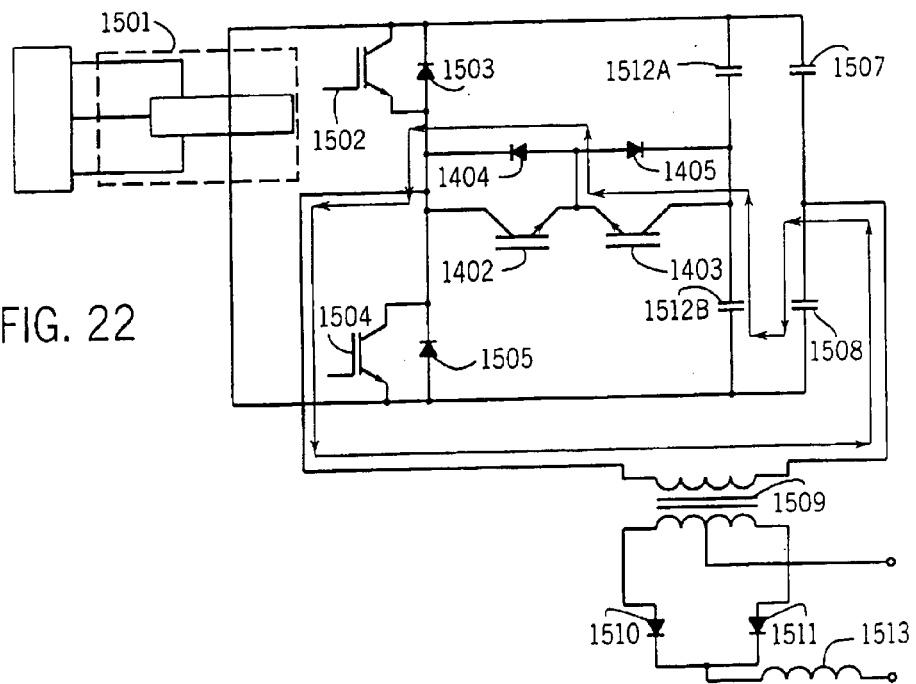

21. The current continues in this path until the voltage across switch 1502 has reached the bus and remaining energy in transformer 1509 is spilled into the bus through diode 1505 (FIG. 22). Capacitor 1512 fully charged so that switch 1504 may be soft switched. The process then repeats.

One feature of the switched snubber used in FIGS. 15–22 is that the main switches (1504 and 1502) do not incur actual losses if the output power is less than necessary to transition snubber capacitor 1512 from "rail to rail". Thus, it is not necessary to fully transition the snubber. The reversible single direction switch prevents snubber interference on turn on, and thus provides snubbing proportional to load. This feature allows very heavy snubbing without restricting the load range of the inverter.

An alternative embodiment includes using a full bridge version of the snubber.

Figure 16:
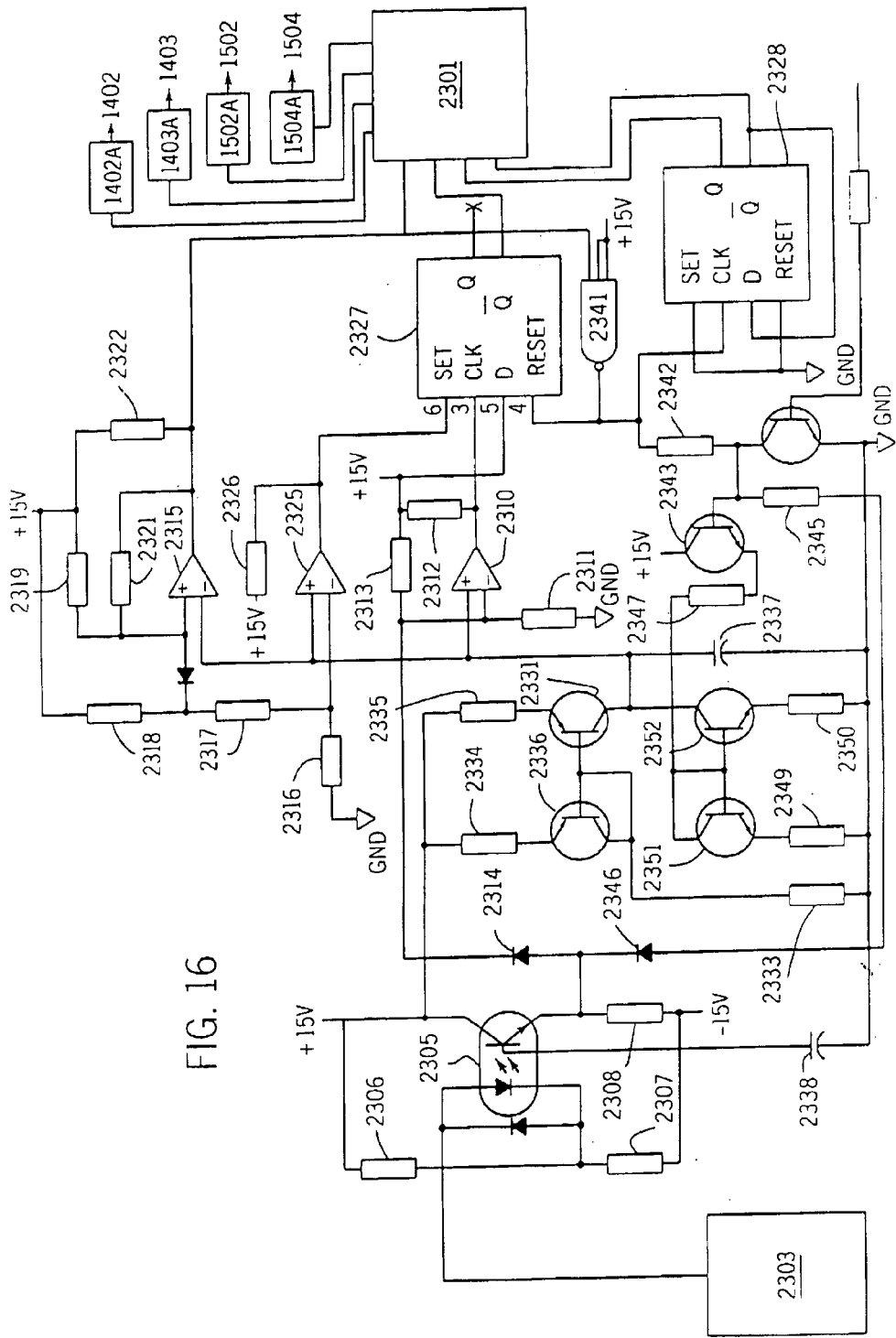
FIG. 16 is a control circuit; diagram.

FIG. 16 shows a control circuit for controlling the switching of the switched snubber in FIGS. 14—22. Four gate drives 1402A, 1403A, 1502A, and 1504A are used to provide the gate signals for switches 1402, 1403, 1502, and 1504, respectively. These gate drives are not shown in detail and are conventional gate drives such as those found in the Miller XMT 304®. The gate drives are inverting in that a high input maintains the gates off and a low input maintains the gates on.

Gates drivers 1402A, 1403A, 1502A, and 1504A are controlled by a logic circuit 2301. Logic circuit 2301 includes a plurality of NAND and OR gates in the preferred embodiment, however it's specific construction may be any of the designer's choosing. And enable signal is included as an input to logic circuit 2301, in one embodiment. They enable signal is used only during power down.

An error amplifying circuit 2303 is also shown in FIG. 16. Error amplifying circuit 2303 may be a standard error circuit and is used, in the preferred embodiment, with a CT feedback signal. The output of error amplifier circuit 2303 is a PWM reference signal. The PWM reference signal control is provided through an opto-isolator 2305 to electrically isolate the remaining portion of the circuit from the error amp circuit. A pair of resistors 2306 (10 K ohms) and 2307 (2 K ohms) scale the PWM reference command for input into opto-isolator 2305. The output of opto-isolator 2305 is scaled from a current to a voltage by a resistor 2300 (10 K ohms).

Generally, the control circuitry implements a modified PWM control scheme. Above a minimum pulse width operation is a typical PWM scheme, and the pulse width is adjusted to increase or decrease current. However, for current less than that corresponding to the minimum pulse width the frequency of pulses is reduced (thus increasing the OFF time). The minimum pulse width is used because the gate drives have a limited speed.

The conventional pulse with modulation portion works with a ramp created by an op amp 2310, resistors 23 (0.10 K ohms), 2312 (10 K ohms), and 2313 (200 K ohms). The PWM reference command is received by op amp 2310 through a diode 2314. The appropriate switch is turned on at the start of the ramp. The ramp is initiated by an op amp 2315 and resistors 2316 (10 K ohms), 2317 (611 ohms), 2318 (20 K ohms). 2319 (200 K ohms), 2321 (6.11 K ohms) and 2322 (2 K ohms).

The main power switches (1502 and 1504) are maintained on for 95% of the total ramp time. The 95% threshold is set by an op amp 2325 and a resistor 2326 (19 K ohms). The switches are turned off by changing states on the set input of a flip flop 2327 (which is connected to op amp 2325). The snubber switches (1402 and 1403) are switched off at 100% of the ramp.

A current source including transistors 2336 and 2331 and resistors 2333 (332 ohms), 2334 (100 ohms) and 2335 (9100 ohms). The current source sets the slop of the ramp. When a capacitor 2337 (100 pF) discharges to a threshold set by a diode 2338 the ramp is restarted. The ramp will continue up at the slope set by the current source until the capacitor voltage reaches the threshold set by op amp 2315 and its circuitry.

A flip flop 2328 is used to alternate between switches, and to receive an enable signal and a machine on/off signal.

Generally, the circuit operates as follows: the capacitor voltage is fully reset down to the minimum and then the ramp begins to ramp up and the voltage on the capacitor is increasing from the current source. As the capacitor charges the output of the opto-isolator is provided to op amp 2310, which pulse width modulates the switches. When the capacitor voltage rises above the reference voltage set by the opto-isolator, op amp 2310 changes state, causing the switch to be turned off. Steering flip flop 2328 determines which one, and only one, of the main power switches are on in a conventional manner. If the capacitor voltage increases to the level set by op amp 2315 (95% of the peak), then the main power switch that is on is turned off.

The frequency adjust (for low current commands) operates as follows: the output of op amp 2315 (the ramp reset) is fed back through a NAND gate 2341 through a resistor 2342 (100 K ohms) and a buffering transistor 2343. The machine on/off signal is also provided to transistor 2343. The output of NAND gate 2341 also causes flip flop 2328 to change state through the clock input.

A voltage divider including resistors 2342 and 2345 (68.1 K ohms) is tied to a diode 2346. If diode 2346 pulls down the voltage at one end of resistor 2345, then the voltage across a resistor 2347 (5.11 K ohms) is also pulled down. A current mirror including resistors 2349 and 2350 (100 ohms) and transistors 2351 and 2352 provide the rest current for the ramp. However, if the voltage through 2346 is slow enough, then the voltage input to transistor 2343 will be grounded, and transistor 2343 will not provide current to current mirror to reset capacitor 2337, thus allowing the ramp to continue upward.

The various aspects of this invention, while described in the context of a welding power supply has applications in many different areas. Generally, in applications where low loss switching is desirable using a boost convertor this arrangement may be used.

Numerous modifications may be made to the present invention which still fall within the intended scope hereon. Thus, it should be apparent that there has been provided in accordance with the present invention a method and apparatus for providing power with a high power factor and low switching losses that fully satisfies the objectives and advantages set forth above. Although the invention has been described in conjunction with specific embodiments thereon, it is evident that many alternatives, modifications and variations will be apparent to those skilled in the art. Accordingly, it is intended to embrace all such alternatives, modifications and variations that fall within the spirit and scope of the appended claims.

What is claimed is:

1. A welding power supply comprising:
   an input rectifier configured to receive an input line voltage and provide a rectified voltage on an output;
   a pre-regulator connected to receive as an input the output of the rectifier and provide a dc bus as an output; and
   a convertor, connected to receive the output of the pre-regulator and provide a welding output;
   wherein the pre-regulator is an SVT switched convertor.

2. The power supply of claim 1, wherein the pre-regulator includes a snubber circuit having a diode that is SVT switched.

3. The power supply of claim 1, wherein the converter is a boost convertor including a switch, and the pre-regulator includes a snubber circuit having a capacitor and an inductor, wherein the capacitor is connected to slow the switch voltage rise while the switch is turning off.

4. The power supply of claim 1, wherein:
the boost converter includes a boost inductor, a switch, and an output capacitor;
the converter includes a snubber, including a snubber capacitor, a snubber inductor, a first snubber diode, a second snubber diode, a third snubber diode, a a fourth snubber diode, and first and second snubber capacitors;
the snubber inductor, switch, and fourth diode are connected such that current may flow from the boost inductor to any of the snubber inductor, switch, and fourth diode;
current flowing through the fourth diode can flow through either the third diode or the second capacitor;
current flowing from the boost inductor through the snubber inductor can flow through either the first diode or the first capacitor;
the fourth diode and the second capacitor are connected across the switch;
current flowing through the third diode can flow through either the first capacitor and the snubber inductor or through the second diode; and
current flowing through the first and second diodes flows to the output.

5. The power supply of claim 3 further including a fifth snubber diode connected in anti-parallel to the switch.

6. A method of providing welding power, comprising
rectifying an input line voltage;
pre-regulating the input line voltage to provide a dc bus; and
converting the dc bus to a welding output;
wherein the step of pre-regulating includes SVT switching a boost convertor.

7. The method of claim 6, wherein the step of pre-regulating includes
maintaining a boost converter switch off, and allowing current to flow through a boost inductor, a snubber inductor, and a first diode, to the dc bus;
turning the switch on and diverting current from the snubber inductor to the switch;
reversing the current in the snubber inductor;
discharging a second capacitor through a first capacitor, a third diode, and the snubber inductor, thereby transferring energy from the second capacitor to the snubber inductor;
diverting current through a fourth diode, the third diode and the first capacitor when the second capacitor is discharged, thereby transferring energy from the snubber inductor to the first capacitor;
turning the switch off and diverting current through the fourth diode and into the second capacitor;
allowing the voltage on the second capacitor to rise until current begins to flow from the snubber inductor to the first capacitor;
diverting current from the second capacitor through a third diode to the second diode;
allowing the current flowing from the boost inductor to the snubber inductor to increase;
diverting current from the first capacitor to the first diode; and
repeating the above.

8. The method of claim 6, further including SVT turning off a diode in a snubber circuit.

9. The method of claim 8, wherein the step of SVT switching a boost convertor includes slowing the switch voltage rise with a capacitor while the switch is turning off.

10. A welding power supply comprising:
an input rectifier means for receiving an input line voltage and providing a rectified voltage;
a pre-regulator means for receiving the rectified voltage and providing a dc bus, wherein the pre-regulator means is connected to the rectifier means; and
a convertor means for receiving the output of the pre-regulator means and provide a welding output, wherein the converter means is connected to the pre-regulator means;
wherein the pre-regulator means includes SVT switching means.

11. The power supply of claim 10, wherein the pre-regulator means includes a snubber means having a diode that is SVT switched.

12. The power supply of claim 10, wherein the boost converter includes a switch, and the pre-regulator includes a snubber circuit means for providing the SVT switching.

13. A welding power supply comprising:
an input rectifier configured to receive an input line voltage and provide a rectified voltage on an output;
a pre-regulator connected to receive as an input the output of the rectifier and provide a de bus as an output; and
an invertor, connected to receive the output of the pre-regulator and provide a welding output;
wherein the inverter includes an SVT switched snubber circuit having a first switch in anti-parallel with a first diode, and a second switch in anti-parallel with a second diode, and wherein the combination of the first switch and first diode are connected in series with the combination of the second switch and the second diode, and wherein the first and second switches are connected in opposing directions.

14. A welding power supply comprising:
a first current path through a transformer in a first direction, the first current path including at least a first switch with an anti-parallel first diode;
a second current path through the transformer in a second direction, the second current path including at least a second switch with an antiparallel second diode;
an SVT switched snubber, including a current path having a third switch with an anti-parallel third diode, a fourth switch with an anti-parallel fourth diode, wherein the third switch and anti-parallel diode are in series with, and oppositely directed from, the fourth switch and anti-parallel diode, and at least one snubber capacitor.

15. The power supply of claim 14 wherein the first and second switches are in a half-bridge configuration.

16. The power supply of claim 14 wherein the at least one snubber capacitor includes a first snubber capacitor connected with a first bus line and a second snubber capacitor connected with a second bus line.

17. The power supply of 14 wherein the at least one snubber capacitor is in series with the third and fourth switches and anti-parallel diodes.

18. A method of providing welding power comprising:

turning on a first power switch and a first snubber switch, and allowing current to flow through the first power switch, a first dc bus, a first power capacitor, and in a first direction through a transformer;

turning the first power switch off and allowing current to flow through the first snubber switch, a second snubber diode, a snubber capacitor, and through the transformer in the first direction, while the first power switch is turning off, to provide a slow voltage transition off;

allowing current to flow through a second anti-parallel power diode, a second DC bus, a second power capacitor, and through the transformer in the first direction, while the first power switch is continuing to turn off, to continue providing a slow voltage transition off;

turning off the first snubber switch;

turning on a second power switch and a second snubber switch after the first power switch is off, and allowing current to flow through the second power switch, the transformer in a second direction, the second power capacitor, and the second bus;

turning the second power switch off and allowing current to flow through the second snubber switch, a first snubber diode, the transformer in the second direction, and a snubber capacitor, while the second power switch is turning off, to provide a slow voltage transition off;

allowing current to flow through a first power diode, the transformer in the second direction, and the first power capacitor, while the second power switch is turning off, to provide a slow voltage transition off;

turning off the second snubber switch;

and repeating the above.

19. The method of claim 18, wherein the steps of turning on the power switches includes soft switching on the power switches.

* * * * *